United States Patent Office 3,371,118
Patented Feb. 27, 1968

3,371,118
AMINATION PROCESS FOR ALIPHATIC
TERTIARY AMINES
Allan J. Lundeen and Kaye L. Motz, Ponca City, Okla., assignors to Continental Oil Company, Ponca City, Okla., a corporation of Delaware
No Drawing. Filed May 8, 1964, Ser. No. 366,155
15 Claims. (Cl. 260—583)

ABSTRACT OF THE DISCLOSURE

A mixture of primary and corresponding secondary mono-chloroalkanes, such as typically provided by the partial chlorination of a paraffin or mixture thereof, is reacted with an acyclic amine nucleophilic agent under conditions resulting in a high selectivity of the aminated derivative of the primary chloroalkanes present in said mixture of alkyl chlorides.

---

This invention relates to a process for the preparation of aliphatic tertiary amines by selectively aminating the 1-chloroalkane isomers present in a partially chlorinated higher linear paraffin or mixtures thereof with lower dialkylamines. In another aspect, the present invention concerns a method involving a selective amination technique for beneficially removing 1-chloroalkane isomers from an admixture of said isomers with corresponding secondary chloro-derivatives.

Aliphatic tertiary amines of the type having two lower alkyl groups and one long chain linear alkyl group attached to the nitrogen atom, specifically those in which the higher alkyl group is attached to the nitrogen atom through a terminal carbon atom, are valuable intermediates for the production of very effective surface active agents of the water-soluble variety. In order to obtain these surfactants, the tertiary amine is converted into an N-oxide; ordinarily by addition of hydrogen peroxide to the amine directly or to a solution of the amine in water, alcohol or other appropriate solvent. In such an oxidation process, prehydration of the amine occurs as the first step, followed by elimination of water to give the N-oxide. The tertiary amines presently used for making the N-oxide surfactants are derived from long chain carboxylic acids obtained by hydrolyzing certain naturally occurring glycerides. The process for converting the carboxylic acid into a suitable tertiary amine intermediate, however, is an involved one and consequently relatively expensive.

The method for preparing the above-mentioned tertiary amines in accordance with this invention is quite different, much simpler and most significantly, considerably less expensive than the prior art method. In our process, the base substances for securing the desirable aliphatic tertiary amines are the straight-chain paraffins of carbon atom lengths ranging from about 8 to 18 which are abundantly available in various petroleum refinery streams from whence they can be readily segregated therefrom in a relatively pure state. It is already well known if these alkanes are chlorinated to a limited extent, that is, if the chlorination level is held to between about 10 and 40 mole percent, substantially only mono-chlorinated derivatives will be formed. Nonetheless, the chloroalkanes present in such chlorination products contain a comparatively uniform destribution of all possible isomers and little or nothing can be done to alter selectivity in this respect. While it has heretofore been known that mono-chloroalkanes can be aminated by reaction with an aliphatic amine, the extant problem was how to isolate the primary isomers in order to prepare tertiary amines of the type having particular usefulness as intermediates for the preparation of desirable surface active agents. In one aspect, our invention provides a method for accomplishing this desideratum.

One of the principal objects of this invention, accordingly, is to prepare valuable aliphatic tertiary amine intermediates in an economical fashion from a comparatively inexpensive and an abundantly available raw material.

Another important manufacturing endeavor in which the present invention has particular applicability is that of preparing water-soluble, biodegradable alkaryl sulfonates. One attractive method for preparing such surfactants first consists of chlorinating a detergent range normal paraffin, and more usually a mixture thereof, to a level of chlorination not exceeding about 40 mole percent. Thereupon, the partially chlorinated product is employed to alkylate an aromatic compound, e.g., benzene, in the presence of an alkylation catalyst. The resultant alkylates are then sulfonated and neutralized to provide the biodegradable detergent. In the aforedescribed alkylation method, the primary chloroalkanes present in the alkylating stock react in an extremely sluggish manner even when the most effective alkylation catalyst for this system is employed, namely aluminum chloride. The presence of primary chloroalkanes, therefore, substantially reduces the efficiency of the process; or if relatively extreme conditions are used to effect reaction of such isomers, product quality as well as processing economics suffers. In accordance with this invention, the primary chloroalkanes present in the partial chlorination products contemplated for use as alkylating agents for the preparation of biodegradable detergent alkylates can be readily and substantially completely segregated therefrom.

Another important object of this invention, therefore, is to provide a method for obtaining improved alkylating stocks especially useful for preparing biodegradable detergent alkylates.

The manner of implementing the present invention in order to achieve the above-enumerated objectives will now be described in detail, following which working examples will be given in order to illustrate to those skilled in the art the best mode contemplated for carrying out the preferred embodiments.

Broadly stated, our novel method comprises reacting a mixture of substantially primary and corresponding secondary mono-chloroalkanes with an acyclic amine containing not in excess of about 30 carbon atoms in the presence of a suitable polar solvent to the extent whereby the primary chloroalkanes present in the reaction mixture are selectively aminated, followed by recovery of the aminated derivatives.

As indicated in the foregoing statement of the present invention, the presence of a polar solvent for both the alkyl chlorides and the amine is essential. A number of organic compounds, however, are useful for this purpose. In general, all organic compounds having less than about 10 carbon atoms and containing either a hydroxyl, nitrile, carboxylate, amino or like polar substituents are applicable. The preferred polar solvents are dimethylformamide, dimethylsulfoxide, acetonitrile and the lower aliphatic alcohols such as methanol and ethanol. Especially preferred of the latter group is methanol. The amount of polar solvent than can be used varies over a wide range, as this specific feature of the process is not particularly critical. A preferred amount of polar solvent based upon the amount of chlorides present in the reaction mixture is an equi-volume one. Larger quantities of the solvent than this will tend to enhance the reaction rate slightly, but it has been observed the resultant improvement in this regard is usually more than offset by the increased handling difficulties involved.

For the purposes of securing selective amination of the primary chloroalkanes present in the reaction mixture, a variety of acyclic amines, hereinafter called nucleophilic agents, can be used provided that they do not contain more than about 30 carbon atoms. Applicable nucleophilic agents include all the primary and secondary amines conforming to the foregoing description. Likewise, a number of tertiary amines can be used satisfactorily as nucleophilic agents provided the alkyl groups are sufficiently small or appropriately varied so that steric hindrance does not become a factor. Additionally, certain hydroxyamines, such as ethanalamine, propanolamine and the like, can be employed for selective amination of the primary chloroalkanes. A specific enumeration of preferred nucleophilic agents include the following lower alkyl amines: methylamine, dimethylamine, trimethylamine, ethylamine, diethylamine, triethylamine, propylamine, dipropylamine and tripropylamine. Of course, it is to be noted that where one desires to prepare the type of aliphatic tertiary amine particularly useful as a detergent intermediate, either dimethyl- or diethylamine will usually be used to aminate the designated alkyl chloride isomeric mixtures.

The amount of nucleophilic agent that can be used varies over an extensive range. Desirably, the molar ratio of nucleophilic agent to the total amount of chloroalkanes present in the reaction mixture should not be less than about two. Molar ratios less than the stated amount tend to form significant amounts of quaternary ammonium chlorides which constitute an undesirable contaminant, particularly if it is contemplated that the aminated product be converted into amine oxides having usefulness as surfactants. There is no theoretical upper limit to the amount of nucleophilic agent that can be used. As a matter of fact, substantial molar excesses of the nucleophilic agent proportionally induce faster reaction rates; however, handling, recovery of unreacted amine, and similar processing problems are faced when such excesses of the amine are used. A particularly preferred molar ratio of nucleophilic agent to the total alkyl chlorides present in the reaction mixture is between about 2.5 and 4.

In order to induce a satisfactory reaction rate, that is, to effect the selective amination of primary chloroalkanes, any temperature within the range of from about 50° to 200° C. can be employed. As regards pressure conditions, either atmospheric or any autogenous pressure for the various contemplated reaction systems is satisfactory.

It has been found that when a mixture of substantially primary and secondary mono-chloroalkanes are reacted with a nucleophilic agent in accordance with the conditions prescribed hereinabove, a substantial proportion of the primary chloroalkanes present will aminate before an appreciable amount of 2-chloro-isomers or before a significant amount of the more internal chlorides similarly react. In fact, it is possible to effect only the amination of the primary chloroalkanes and at the same time convert a major amount thereof present in the reaction mixture. Reaction duration times, therefore, depend for the most part upon the degree of selectivity sought. In turn, the required reaction residence time for obtaining any given degree of selectivity is a readily ascertainable variable primarily governed by the particular reaction parameters involved, namely, the temperature employed, ratio of nucleophilic agent to chlorides, the specific nature of the nucleophilic agent used, the polarity of the solvent medium and the like. Upon carrying out the reaction to the extent desired, further reaction can be stopped by cooling the reaction mixture to room temperature or below. The aminated product can then be recovered by washing the mixture with an aqueous acid solution. Sulfuric acid and hydrochloric acid are each suitable for this purpose.

In order to illustrate this invention further, the following specific examples are set forth. As indicated, these examples are given primarily for purposes of illustration and accordingly any enumeration of details contained therein should not be interpreted as limitations upon the invention except as indicated in the appended claims.

*Example I*

This example illustrates a method in accordance with this invention for completely removing the primary monoalkanes present in an admixture containing corresponding secondary isomers.

A mixture of normal paraffins of carbon atom lengths ranging between 11 and 15 and having an overall average molecular weight of about 185 was chlorinated at a temperature of 35°–40° C. until the amount of combined chlorine was about 3.6 percent. This extent of chlorination represented a conversion of the normal paraffins to chloroparaffins of about 20 mole percent. Of the paraffins chlorinated, about 13 percent was composed of primary mono-chloroalkanes. The balance was composed of the various secondary isomers.

To a suitable glass-lined autoclave were added 6.7 liters of the chlorination product described directly above, 790 grams of dimethylamine and 4.5 liters of methanol. The temperature was brought to 130° C. and maintained for 100 minutes. The reaction mixture was quickly cooled and the pressure released. The mixture was then stripped of methanol and excess dimethylamine by heating.

The brown residual material was divided into two equal portions, each of which was extracted three times with 750 ml. of 10 percent sulfuric acid. The combined acid extracts were then washed with three 500 ml. portions of pentane. The pentane washings were concentrated and the small residue obtained was added to the original hydrocarbon layers. The acid extracts were cooled in an ice bath and then neutralized with 50 percent sodium hydroxide. This mixture was washed with 2 liters of pentane and after drying over sodium sulfate, the pentane was distilled off, yielding a brown residue. The residue was then simply distilled to give 165 grams of light yellow product with the boiling point of 56°–118° C. at 0.45 mm.

Nuclear magnetic resonance analysis showed the distilled product to contain at least 65 percent 1-dimethylamino derivatives. From a chlorine balance it was determined that essentially all of the primary mono-chloroalkanes present in the initial reaction mixture was aminated. The balance of the aminated product consisted predominantly of 2-dimethylamino derivatives. This product was observed to possess a satisfactory quality with respect to physical and chemical properties for the preparation of oxide derivatives useful for detergent applications.

*Example II*

The residual alkane-alkyl chloride mixture of Example I was dehydrated by azeotropically distilling the mixture in the presence of added benzene.

The dried alkyl chloride-alkane mixture was then employed to alkylate benzene. In the alkylation reaction, the ratio of benzene to alkyl chlorides present in the alkylation reaction mixture was approximately 10. A comparative run identical to the foregoing was made employing as the alkylating agent the chlorination product described in Example I. Another comparative run was included in this series in order to show the reaction conditions required for effecting conversion of primary mono-chloroalkanes. Further reaction conditions observed in these respective runs, together with the results obtained in terms of percent conversion of alkyl chlorides present is set forth in the following Table I.

TABLE I

| Run | Alkylating Agent | Percent AlCl₃ | Temp., °C. | Time (min.) | Percent Conversion |
|---|---|---|---|---|---|
| 1 | Unaminated | 4 | 65 | 90 | 98.9 |
| 2 | do | 4 | 50 | 30 | 91.0 |
| 3 | Aminated | 4 | 50 | 30 | 99.5 |

*Example III*

This example illustrates the effect of reaction residence time upon resultant product selectivity. The N-alkyl reactant corresponds to the chlorination product described in Example I. Other reaction parameters include: a reaction temperature of 94° C.; methanol as the polar solvent; a methanol/RCl volume ratio of 4; and a molar ratio of dimethylamine to RCl of 10. As indicated, the variable in this instance is reaction time, such being measured in terms of reaction half life which for the particular system involved is about 10 minutes. Product distribution resulting during the course of a plurality of half lives is set forth in the following Table II.

TABLE II.—EFFECT OF REACTION TIME ON REACTION PRODUCT IN THE AMINATION OF "N-ALKYL CHLORIDES"

| No. of Half Lives | Parts of Product per 100 Parts of "N-alkyl Chloride" | 1-dimethylamino Derivatives | | Secondary Dimethylamino Derivatives | |
|---|---|---|---|---|---|
| | | Percent | G./100 g. RCl | Percent | G./100 g. RCl |
| 1 | 6.68 | 89.9 | 6 | 10.1 | .68 |
| 2 | 10.63 | 86.9 | 9 | 13.1 | 1.36 |
| 3 | 12.54 | 83.8 | 10.5 | 16.3 | 2.04 |
| 4 | 13.88 | 80.4 | 11.16 | 19.6 | 2.72 |
| 5 | 15.02 | 77.3 | 11.62 | 22.6 | 3.40 |

What is claimed is:

1. A process for preparing an aliphatic tertiary amine of the formula $R_1R_2R_3N$, wherein $R_1$ is a linear alkyl group of from 8 to 18 carbon atoms to which the nitrogen atom is attached at a terminal carbon atom thereof and $R_2$ and $R_3$ are each selected from the group consisting of methyl and ethyl radicals which comprises the steps:
   (1) reacting from about 0.1 to 0.35 mole of chlorine with one mole of a $C_8$–$C_{18}$ straight-chain paraffin to form a mixture of substantially primary and secondary mono-chloroalkanes;
   (2) selectively aminating the primary chloroalkanes present in the chlorination product of step (1) by reacting said product in a polar solvent at a temperature between about 50° and 200° C. with nucleophilic agent selected from the group consisting of dimethylamine and diethylamine; and
   (3) washing the amination reaction mixture to recover the tertiary amine component thereof.

2. A process in accordance with claim 1 wherein the molar ratio of said nucleophilic agent to the total amount of chloroalkane present in said chlorination product is at least 2.

3. A process in accordance with claim 1 wherein the molar ratio of said nucleophilic agent to the total amount of chloroalkane present in said chlorination product is between about 2.5 and 4.

4. A process in accordance with claim 3 wherein said polar solvent is methanol.

5. A process in accordance with claim 4 where said nucleophilic agent is dimethylamine.

6. A process in accordance with claim 4 wherein said nucleophilic agent is diethylamine.

7. A process in accordance with claim 5 wherein the chlorination product of step (1) is obtained by reacting about 0.2 mole of chlorine with one mole of a $C_8$–$C_{18}$ straight-chain paraffin.

8. A process in accordance with claim 6 wherein the chlorination product of step (1) is obtained by reacting about 0.2 mole of chlorine with one mole of a $C_8$–$C_{18}$ straight-chain paraffin.

9. A process for preparing the aminated derivative of a primary mono-chloralkane present in admixture with the corresponding mono-chloroalkanes having the chloro group attached to a secondary carbon atom which comprises:
   (1) reacting said mixture in a polar solvent at a temperature between about 50° and 200° C. with an acyclic amine containing not in excess of about 30 carbon atoms to the extent whereby the primary chloroalkanes present are selectively aminated; and
   (2) washing the amination reaction mixture with aqueous acid to recover said aminated derivative.

10. A process for preparing the aminated derivative of a primary mono-chloroalkane present in admixture with the corresponding mono-chloroalkanes having the chloro group attached to a secondary carbon atom which comprises:
   (1) reacting said mixture in methanol at a temperature between about 50° and 200° C. with a nucleophilic agent selected from the group consisting of primary and secondary acyclic amines containing not in excess of about 30 carbon atoms to the extent whereby the primary chloroalkanes present are selectively aminated; and
   (2) washing the amination reaction mixture with aqueous acid to recover said aminated derivative.

11. A process in accordance with claim 10 wherein the molar ratio of said nucleophilic agent to the total amount of chloroalkanes present in said mixture is at least 2.

12. A process in accordance with claim 10 wherein the molar ratio of said nucleophilic agent to the total amount of chloroalkanes present in said mixture is between about 2.5 and 4.

13. A process in accordance with claim 12 wherein said nucleophilic agent is a secondary amine.

14. A process in accordance with claim 13 wherein said primary amine is dimethylamine.

15. A process in accordance with claim 13 wherein said primary amine is diethylamine.

References Cited

UNITED STATES PATENTS

| 1,836,048 | 12/1931 | Somerville | 260—583 X |
| 2,172,822 | 9/1939 | Tamele et al. | 260—585 X |
| 2,305,830 | 12/1942 | Profft | 260—585 |
| 3,294,851 | 12/1966 | Roobol et al. | 260—583 X |

CHARLES B. PARKER, *Primary Examiner.*

R. L. RAYMOND, *Assistant Examiner.*